(12) United States Patent
Ratnaparkhi

(10) Patent No.: US 7,424,469 B2
(45) Date of Patent: Sep. 9, 2008

(54) SYSTEM AND METHOD FOR BLENDING THE RESULTS OF A CLASSIFIER AND A SEARCH ENGINE

(75) Inventor: Adwait Ratnaparkhi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 485 days.

(21) Appl. No.: 10/752,901

(22) Filed: Jan. 7, 2004

(65) Prior Publication Data

US 2005/0149504 A1 Jul. 7, 2005

(51) Int. Cl.
*G06F 7/00* (2006.01)
(52) U.S. Cl. .............................. 707/3; 707/7
(58) Field of Classification Search .............. 707/3, 707/7
See application file for complete search history.

(56) References Cited

U.S. PATENT DOCUMENTS

| | | | | |
|---|---|---|---|---|
| 6,804,662 | B1* | 10/2004 | Annau et al. | 707/2 |
| 2002/0198869 | A1* | 12/2002 | Barnett | 707/3 |
| 2003/0120653 | A1* | 6/2003 | Brady et al. | 707/7 |
| 2004/0034652 | A1* | 2/2004 | Hofmann et al. | 707/102 |
| 2004/0243632 | A1* | 12/2004 | Beyer et al. | 707/104.1 |

OTHER PUBLICATIONS

Ron Hose, INvestigation of Sentence Level Text Reuse Algorithms, 2001.*
Cui, H. et al., "Probabilistic Query Expansion Using Query Logs", *International World Wide Web Conference, Proceedings of the 11th Conference on World Wide Web*, 2002, 325-332.
Li, L. et al., "Improvement of HITS-based Algorithms on Web Documents", *International World Wide Web Conference, Proceedings of the 11th Conference on World Wide Web*, 2002, 527-535.
Ling, C.X. et al., "Improving Encarta Search Engine Performance by Mining User Logs", *International Journal of Pattern Recognition and Artificial Intelligence*, 2002, 16(8), 12 pages.
Ogilvie, P. et al., "Combining Document Representations for Known-Item Search", *ACM SIGR Conference on Research and Development in Information Retrieval*, 2003, 143-150.

* cited by examiner

*Primary Examiner*—Wilson Lee
*Assistant Examiner*—Angela M Lie
(74) *Attorney, Agent, or Firm*—Woodcock Washburn LLP

(57) ABSTRACT

A method to produce a list of documents retrieved from a search engine, ranked according to their relevance to search terms, includes interleaving the lists resulting from two searches. The first search is one that occurs over documents where the list is ranked using a first probabilistic ranking algorithm. The second list is a list of documents obtained by searching over a query log of prior searches using the same search terms. The second list is ranked according to a second probabilistic algorithm. Interleaving of the two lists includes eliminating duplicate occurrences of documents and appending the remaining documents to the end of the interleaved list if the two lists of individual search results differ in length. The interleaved list may then be presented to a user for review.

20 Claims, 5 Drawing Sheets

SYSTEM AND METHOD FOR BLENDING THE RESULTS OF A CLASSIFIER AND A SEARCH ENGINE

FIELD OF THE INVENTION

This invention relates in general to the field of information technology. More particularly, this invention relates to the use of a method of blending search results in a retrieval of information.

BACKGROUND OF THE INVENTION

Search engines are now commonplace in many software applications. Search engines may be used for searching for text strings in applications such as word processors, for searching for help in sophistical software as varied as spreadsheets and operating systems, and for searching for URLs, references and other documents in web-based search engines. The effectiveness of any one search may be abstractly judged by whether the top few returned documents are the documents actually sought by the user. The returned list should preferably be sorted by relevance to the user in the context of the search terms that were used. This ordering of documents makes it easier for a user to select the document that he believes has the greatest relevance to his search.

A search engine may be used to generate a list of documents such that the documents have a relation to search terms. Since databases of documents can be large and since any one search engine may have access to multiple document databases, the volume of documents retrieved by a search may also be large. Ranking the documents according to some relevance criteria is one way to assist the user in finding his preferred document.

A great number of information retrieval systems, such as search engines, use a probabilistic ranking algorithm, such as the well known OKAPI algorithm, for ranking a retrieved set of documents resulting from a search. OKAPI is the name given to a family of retrieval systems that have been developed over the past few decades. The OKAPI-type systems are based on the Robertson-Sparck Jones probabilistic model of searching. OKAPI originated as an on-line library catalogue system and since has been used as the basis for services in various contexts.

It is desirable for a search engine to have a capability to rank documents in a way that allows the user to easily find the most relevant document with respect to the search. Otherwise, the user may be overwhelmed by the amount of unsorted information presented. Thus, there is a need for a method of ranking retrieved documents to provide a means to improve the accuracy of a search tool to pinpoint the most relevant documents of interest in a set of retrieved documents.

SUMMARY OF THE INVENTION

A method and system are discussed which allow a list of documents retrieved from a search engine to be ranked according to their relevance to the search terms. The present invention uses a first probabilistic ranking algorithm to rank documents from a document database. The intermediate result is a first ranked list. The present invention also uses a second probabilistic ranking algorithm to rank documents from a set of query data. This intermediate result is a second ranked list. The output list of the invention is an interleaving of the first ranked list and the second ranked list.

In one embodiment, a form of the well-known OKAPI ranking algorithm is used to order the first ranked list. The second ranked list is ordered via the use of either the Naive Bayes or the maximum entropy algorithms. The interleaving scheme used is an alternation of documents from the first ranked list and the second ranked list. The interleaved list contains the top ranked documents from the first ranked list and the second ranked list such that the top-ranked documents appear as the top entries in the interleaved list. In one embodiment, the interleaving appends the remaining items of the longer of the two lists to the end of the interleaved list when the two lists have differing lengths. Duplicates in the interleaved list are removed by keeping the first or best ranked occurrence and removing repeated occurrences.

One embodiment of the invention takes the form of a search engine ranking technique for a help function in an operating system or application software. Yet another embodiment may be an implementation where various aspects of the invention may be distributed on a network. For example, a user computer may contain software for performing the interleaving function whereas the search engine and document databases searched may be distributed separately on the network.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

It is well known that search engines can return a list of documents containing search terms that a user wishes to find within a collection of documents. To save the user time in sorting through the returned list, it is also desirable to order the returned list of documents such that the user may find his desired document in the top few entries of the returned list. To that end, the current invention address a system and method to produce a ranking of searched and retrieved documents so as to maximize the probability that the first few entries contain the users desired document.

The general approach is to obtain a first list of documents which have been ranked according to a well-known ranking mechanism and to interleave a second list of documents. The second list of documents may be obtained by using a different ranking mechanism that uses the co-occurrence frequencies of search terms and documents. The search terms and documents being extracted from query logs of prior searches. The resultant blending of results occurring from the combination of the two ranked lists may produce an interleaved list that has higher occurrence of producing a favored document than prior art systems.

After discussing an exemplary prior art system in conjunction with FIG. 1, an exemplary system will be discussed in conjunction with FIGS. 2-4. An exemplary computing environment is also discussed in conjunction with FIG. 5.

Exemplary Embodiments of the Invention

Figure 1:
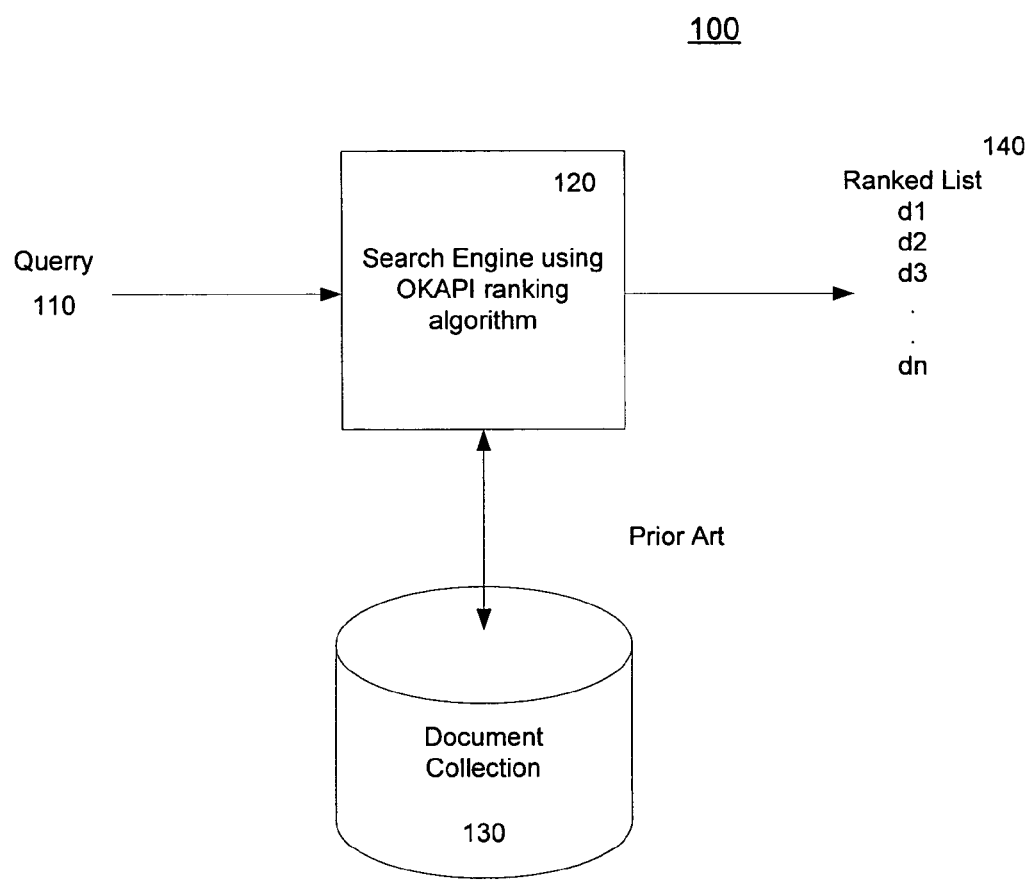
FIG. 1 is a block diagram of a prior art search tool.

FIG. 1 illustrates a prior art system 100 using a probabilistic ranking mechanism. As an example, the well-known OKAPI ranking algorithm may be used. OKAPI is the name given to a family of retrieval systems based on the Robertson-Sparck Jones probabilistic model of searching. In the example of FIG. 1, a query 110 enters the search engine tool containing the exemplary OKAPI algorithm and a search is begun. A query is a string of words that characterizes the information that a user seeks. The search engine itself may be any well known search engine known in the art of information retrieval systems. The search engine first prepares the input query 110 for input by the engine and applies the search terms to an available document collection 130 to search for terms in the documents corresponding to the input query. A document may be defined as any piece of information that the user may want to retrieve. A document could be a text file, a World Wide Web page, a newsgroup posting, a picture, or any other type of digitally represented entity or sub-entity of information.

The query against the document collection 130 returns a list of documents matching the search criteria. The list is then typically ranked using the OKAPI algorithm. The scoring of the returned documents takes into account the number of times the search terms appear in a document normalized with respect to the document length. The normalization resulting from the OKAPI algorithm removes the bias a longer document may have given that it may have more instances of a particular search term. This normalization function also favors terms that are specific to a document and rare across other documents. All of the returned documents are thus ranked with the most relevant document getting a high score of one hundred points. The ranked documents 140 are then produced for the user to examine.

Typically, the examination is performed on a computer device display mechanism where a user may review in brief the contents of a document or review the document title and then position a cursor and select using a pointer device such as a computer mouse a document to view.

Figure 2:
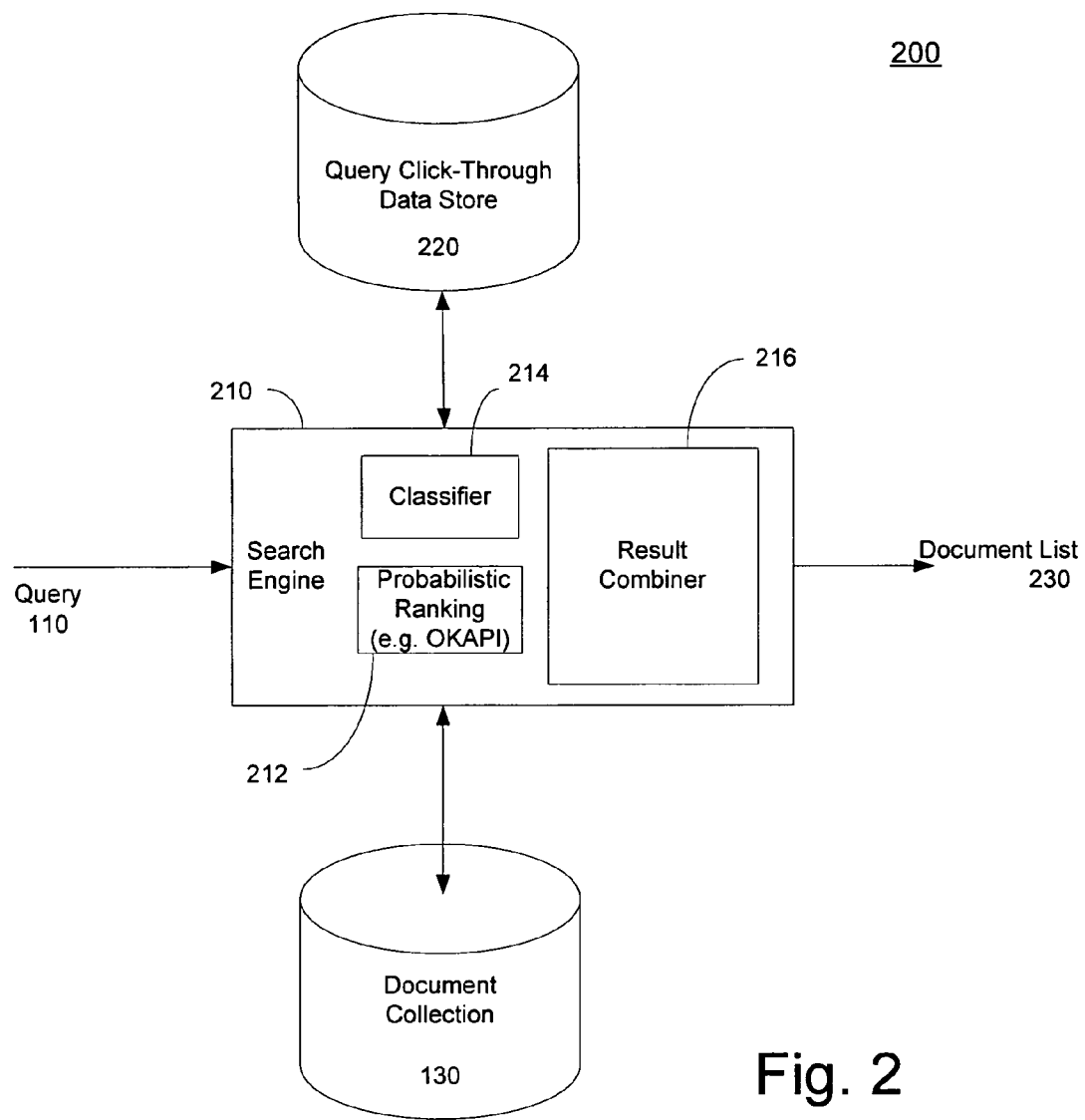
FIG. 2 is a block diagram showing aspects of the current invention.

FIG. 2 illustrates a block diagram of one embodiment 200 of the current invention. As described above with respect to FIG. 1, a query 110 containing a user's search terms is entered into a search engine 210. The search engine may first prepare the input query and then apply the search terms to an available document collection 130 to search for terms in the documents corresponding to the input query. The returned documents may then be ranked using a probabilistic ranking algorithm 212, such as the OKAPI algorithm or one of its derivatives. The ranked documents are in turn provided to the result combiner 216.

In a parallel activity, the search engine may also use a classifier 214 to search a query click-through data store 220 to search for documents previously retrieved and selected by a user where similar search terms were used. The classifier 214 is an implementation of a machine-learning environment where user selections against a list produced in a search are used to tally the document selections against query parameters. Query click-through data is metadata obtained from previous searching sessions with the search engine. Query click-through data, also known as a query log, represents the actual selection of a document by at least one user under the conditions of a search. Query logs are generally obtained by recording the selection that a user makes as to which returned document is most relevant to his purposes after viewing his search results. Query logs generally represent relevant selections from multiple users and can be of value in correlating search terms with documents. This correlation may be especially strong if the query logs were generated while different users were using a search tool on the same document set that is used in the document collection in any one implementation. However, this condition is not a requirement of successful operation of the invention. In one embodiment, a query log may take the form of a matrix of possible search words versus documents. The intersection of the two parameters being the frequency of occurrence of the search term in the document. The frequency of occurrence may be the result of user click-through hits on the respective document and search term. Tabularized query log data is a valuable correlation of search terms, documents and relevance frequency.

Returning to FIG. 2, search terms 110 may be entered into the classifier 214. The classifier 214 subsequently uses the query click-through or query log data 220 to search for documents containing the indicated terms. The classifier examines the query log data and extracts the frequency data. The frequency data is further processed by application of a second probabilistic ranking model.

In the information retrieval context, a probabilistic ranking model is an algorithm that computes the probability that a document containing search terms is the single document of interest. Once a probability is calculated and assigned to documents in a list, the entire list may be sorted according to the probability rankings. The resulting list is an ordered list where the document assigned the highest probability generally occurs first. In one embodiment, the second probabilistic models used in association with the classifier 214 are the maximum entropy probability model and the Naive Bayes probability model. In one version of this embodiment, only one of either the maximum entropy or the Naive Bayes algorithm type is used. In the other version of the embodiment, the other algorithm type is used. With either version of the embodiment, the frequency information of the query log data is used to produce a probability ranking for each of the returned query log entries. The classifier may then order the list of returned query log document data according to the ranking where the highest probability document appears first. This ordered list may then be provided to the result combiner 216.

At this time, the results combiner 216 has accumulated the exemplary OKAPI-ranked results from the search engine using the document collection 130. The results combiner 216 has also accumulated the list of relevant documents associated with the query click-through data from previous searches which is now ordered according to the second probabilistic model. The results combiner then combines and orders the two sets of results into a single document list 230. The document list 230 is a list that is ordered to provide both maximum recall and precision simultaneously.

Recall is a standard of measure of information retrieval performance and may be defined as the number of relevant documents retrieved divided by the number of relevant documents in a data collection. For example, given a set of eighty documents relevant to a search term in a document collection, if a system returns sixty documents, forty of which are judged relevant by the user, then the system's recall is fifty percent (40/80=50%). In an ideal world, recall would be 100 percent. However, since this is trivial to achieve by retrieving all documents, a system must attempt to maximize precision as well. Precision may be defined as the number of relevant documents divided by the total number of documents retrieved. For example, suppose that there are eighty documents in a data collection relevant to a search term. If a system returns sixty documents, forty of which are judged relevant by the user, the system is (40/60=67%) precise. In an ideal world, precision would be one hundred percent. However, since this is trivial to achieve by returning just one relevant document, a system should attempt to maximize recall as well. The conclusion is that both recall and precision are desirably maximized in an information retrieval system.

Returning to FIG. 2, the function of the result combiner 216 is to combine the results of the exemplary OKAPI ranking with that of the probabilistically ordered query log return. The document list 230 may have an order that differs from either the exemplary OKAPI ranking or the query log order. Given that the results from the exemplary OKAPI ranking algorithm using the search engine may be expressed as $s1, s2, s3, s4, \ldots sm$ where $s1$-$sm$ represent documents in the relevance order resulting from the exemplary OKAPI ranking, and the results from the classifier 214 may be expressed as $c1, c2, c3, c4, \ldots cn$ where $c1$-$cn$ represent documents in the relevance order resulting from the query log, then the final document list 230 may be formed by interleaving both lists. The result of the interleaving function of the results combiner may be expressed as $c1, s1, c2, s2, c3, s3, c4, s4, \ldots cn, sm$ where n and m are integer values and may have any value with respect to one another. Any duplicates in the list are removed by retaining the higher ranked occurrence and deleting redundant occurrences.

It should be noted that alternate embodiments of the invention may involve alternate interleaving methods. Some examples of the alternate interleaving methods may be expressed as follows:

Option 1 interleaving=$s1, c1, s2, c2, s3, c3, s4, c4, \ldots sm, cn$.
Option 2 interleaving=$c1, c2, s1, s2, c3, c4, s3, s4, \ldots cn, cn+1, sm, sm+1$.
Option 3 interleaving=$s1, s2, c1, c2, s3, s4, c3, c4, \ldots sm, sm+1, cn, cn+1$.
Option 4 interleaving=$c1, c2, c3, s1, s2, s3, \ldots cn, cn+1, cn+2, sm, sm+1, sm+2$.
Option 5 interleaving=$s1, s2, s3, c1, c2, c3, \ldots sm, sm+1, sm+2, cn, cn+1, cn+2$.
Option 6 interleaving=$s1, s2, c1, s3, s4, c2, s5, s6, c3 \ldots$.
Option 7 interleaving=$c1, c2, s1, c3, c4, s2, c5, c6, s3 \ldots$.

Other combinations of interleaving are possible and easily generated by those of skill in the art. Such alternate interleaving schemes are in keeping with the invention and may also yield better search accuracy than the prior art.

If one of the lists, either the ranked exemplary OKAPI list or the query log list is shorter than the other, the interleaving function of the result combiner 216 may append the remainder of the larger list to the end of the interleaved list.

The interleaved results of the two searches described above using the $c1, s1, c2, s2, c3, s3, c4, s4, \ldots cn, sm$ interleaving method generally exceed results obtained via prior art methods of search ranking. Table 1 indicates the first item listed accuracy (top one) of systems using the same document set but with different document retrieval system types.

TABLE 1

System Performance Comparison

| System Type | Accuracy for Top 1 |
| --- | --- |
| OKAPI without Query Log (Prior Art) | 28.35% |
| OKAPI with Query Log (Prior Art) | 41.79% |
| Invention using Naive Bayes Algorithm | 45.71% |

The performance data of Table 1 compares the current invention using the Naive Bayes algorithm with an information retrieval system using the exemplary OKAPI algorithm by itself and augmented with query log data. As discussed above, the current invention uses interleaved results of a probabilistic ranking algorithm, such as the OKAPI algorithm with a list of searched query log data ordered by a selected probabilistic model, such as Naive Bayes or maximum entropy. Table 1 indicates that the top one document on the final ordered list of the system using the invention with the Naive Bayes algorithm found and place the correct document on the top of the list 45.71% of the time. The system using a prior art OKAPI ranking technique augmented with unranked query log data was correct only 41.79% of the time. The prior art technique of using an OKAPI ranking system alone found the top one document only 28.35% of the time. Other performance data (not shown) indicates that the invention using the maximum entropy algorithm as the probabilistic ranking model on the query log return data performed slightly better than the Naive Bayes algorithm.

In one embodiment, a user may use the invention to more efficiently search for a help topic in a software application by typing a query in a search box in a computer system environment, such as a Windows operating system environment. One key statistic commonly used to measure the performance of a search system is relevance. Relevance is an abstract measure of how well a document satisfies the user's informational need. A perfect search system would return all relevant documents to the user. Query log data or click-through data is extremely relevant data to the search because it represents what the user may wish to view. A computer environment may record user queries and corresponding user click-throughs to generate a database of query log data. This database of query log click-through data represents enhanced relevance data for the help topic search engine. In this embodiment, the query log data may be used with the database of the help information of the computer system along with the selected probabilistic algorithm to generate a help topic results that has greater accuracy than if the help data alone were searched. The data are deemed more accurate because the recall and precision are maximized and thus accuracy in terms of relevance is enhanced.

In a help topic search engine embodiment, the machine-learning classifier may use the query log data as training material. The exemplary OKAPI-type search engine requires only the help database content. Both the classifier and the search index need to be "initialized" before they can be used, i.e., the classifier may to be trained or entered into the system and the search engine may index the documents. After initialization, given a novel query, both the classifier and search engine are able to produce a ranked list of documents that are relevant to the query. The help topic documents related to the classifier are ranked according to the selected probabilistic model used; preferably either Naive Bayes or maximum entropy. The help topic documents related to the use of the exemplary OKAPI-ranked search are also collected. The two lists are interleaved as described previously, and the results are provided for a user to examine. The results should increase the occurrence of the users preferred document being in the top few entries of the resulting list over that of prior art systems. The user's selections or click-throughs of the ranked results may serve as additional information for the query log to improve the top hit documents of future searches.

Figure 3:
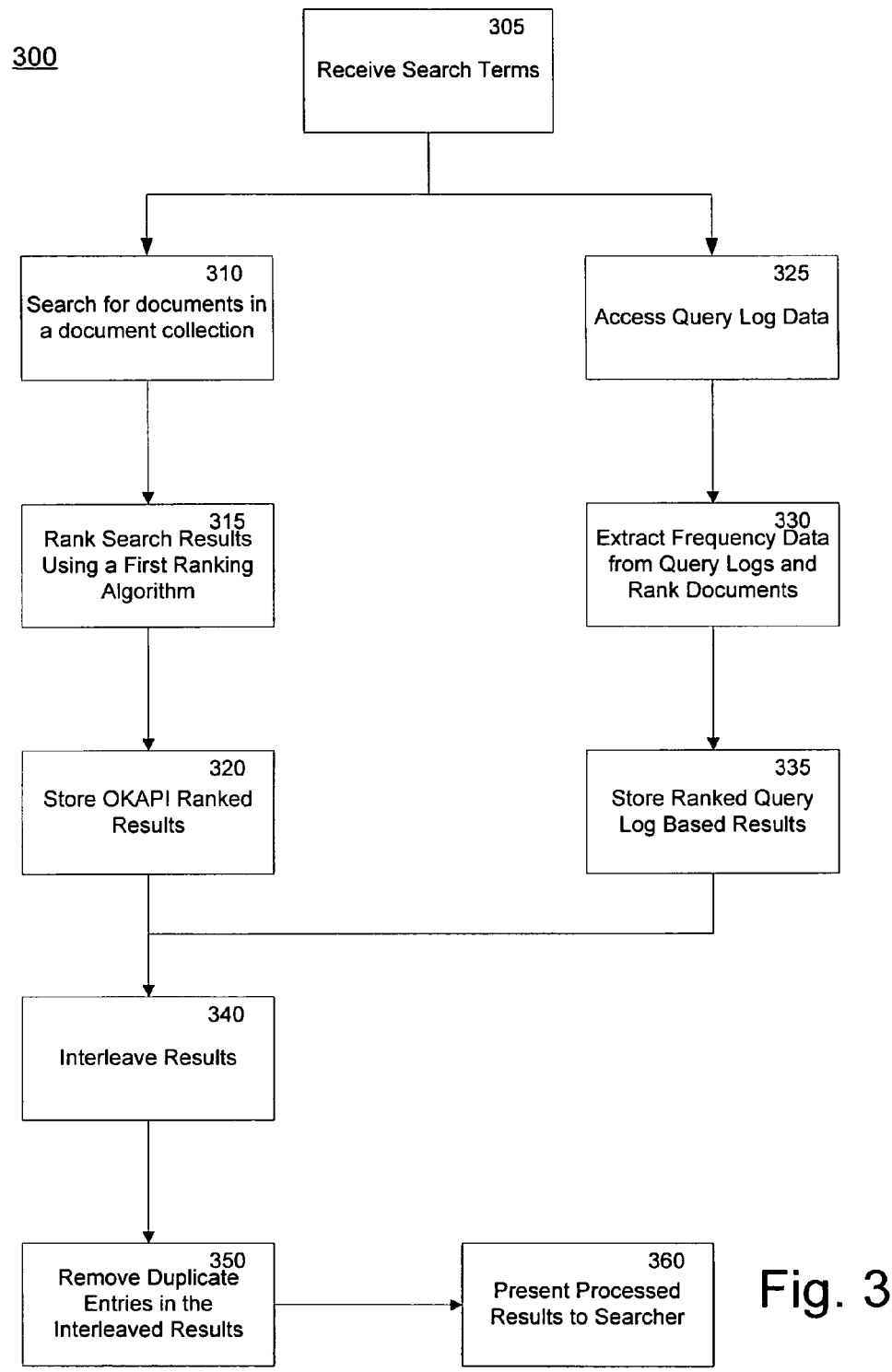
FIG. 3 is a flow diagram depicting a method of the current invention.
Figure 4:
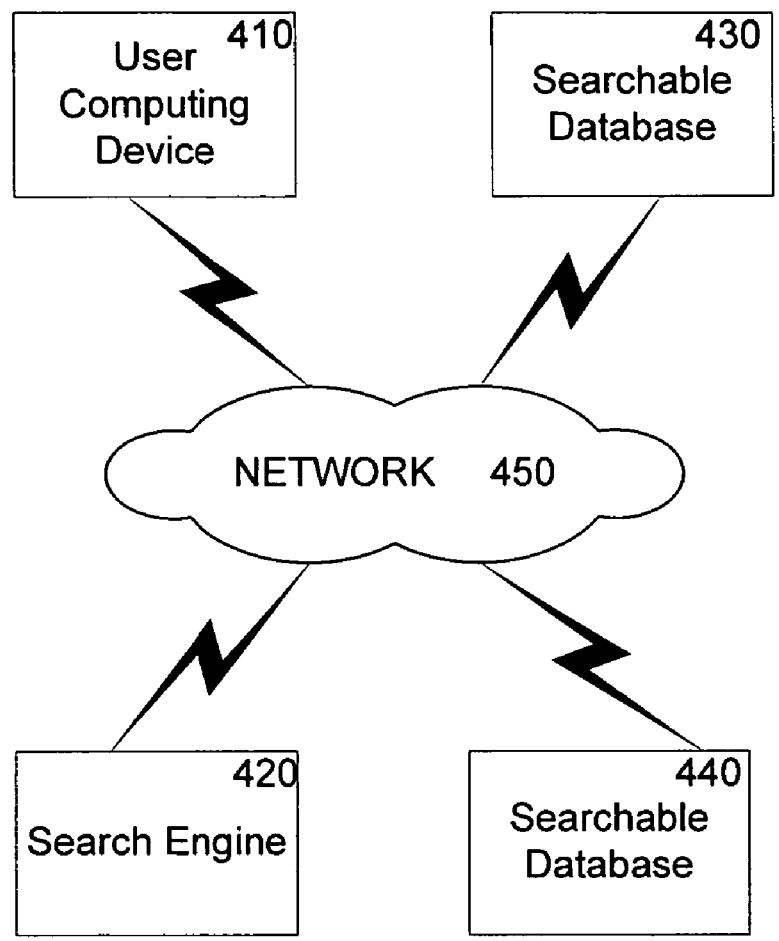
FIG. 4 is an exemplary network in which aspects of the invention may be implemented.

FIG. 3 is a flow diagram 300 of a method associated with the invention. Initially, search terms are received (step 305) by a system implementing the invention. The search terms may be prepped by the system to be utilized by a one or more search engines operating on the search terms. In the flow diagram of FIG. 3, two search paths are shown. In one path, the search terms are passed to a search engine which performs a search (step 310) for document matching the search terms. The search is preferably conducted against a document collection accessible by the underlying search engine. The search engine produces results which are ranked and sorted (step 315) according to the weighting criteria utilized by a first probabilistic ranking algorithm, such as the OKAPI algorithm. The ranked results of the search are then stored (step 320) for later use.

In another search path, preferably occurring simultaneous with steps 310-320, query log data is accessed (step 325) using the received search terms. The frequency information concerning the search terms is extracted from the query log data (step 330) and is used by a second algorithm to produce a ranked list of document results. Preferably, the second probabilistic algorithm is either the Naive Bayes or the maximum entropy algorithm. The results of the search of query log data are sorted and stored (step 335).

The results of the first probabilistic ranking, (e.g. the exemplary OKAPI-based ranking) and the second probabilistic ranking on the query log based results are interleaved (step 340). The interleaved results are scanned to remove (step 350) duplicates where the first occurrence of a duplicate document is retained in the interleaved list. Finally, the fully processed list is presented to a user for his review (step 360).

As mentioned above, FIG. 2 represents a block diagram of the functional aspects of the invention. The invention may be implemented in a single exemplary computer system or in a network of computers systems. FIG. 4 is an exemplary network representation 400 of an embodiment of the invention. Using the principles of network communications, elements of the invention may be distributed across a network to serve the functions of the invention. For example, in the FIG. 4 exemplary network, a user computing device 410 may be used to initiate a search. The actual search engine used may be on a node on the network that functions as a search engine 420. One of many searchable databases 430, 440 may be located on the network and may be available for the search engine 420 to search over. The user computing device may contain the query log data and the second probabilistic model such as the Naive Bayes or maximum entropy algorithm along with the classifier 214 and combiner functions 216 described with respect to FIG. 2. Search results from the search engine 420 and searchable databases 430 and 440 may be interleaved with search results from the query log data available via the user computing device to implement the method of the invention.

Another embodiment of a networked embodiment of the invention may be to move the query log data out of the user computing device 410 and place it into a networked node (not shown) which can perform the query log search portion of the invention. In this embodiment, the user computing device may then acquire the results from the networked search engine 420 and the networked engine performing the query log search (not shown) and combine the results per the interleaving method of the invention in the user computing device.

Exemplary Computing Device

Figure 5:
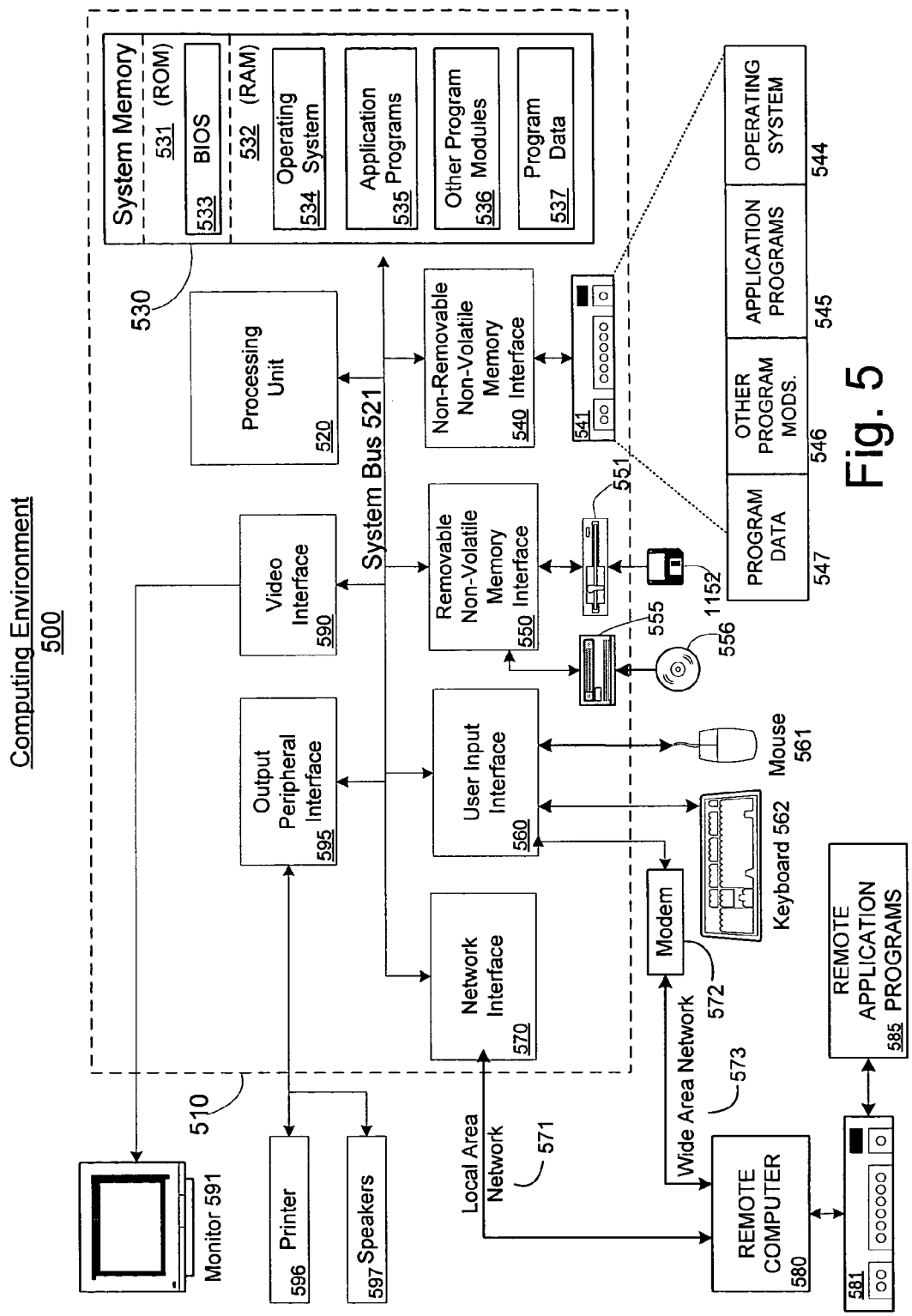
FIG. 5 is a block diagram showing an exemplary computing environment in which aspects of the invention may be implemented.

FIG. 5 and the following discussion are intended to provide a brief general description of a suitable computing environment in which the invention may be implemented. It should be understood, however, that handheld, portable and other computing devices and computing objects of all kinds are contemplated for use in connection with the invention. Thus, while a general purpose computer is described below, this is but one example, and the invention may be implemented with other computing devices, such as a client having network/bus interoperability and interaction. Thus, the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation according to the invention.

Although not required, the invention can be implemented via an operating system, for use by a developer of services for a device or object, and/or included within application software that operates according to the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 5 thus illustrates an example of a suitable computing system environment 500 in which the invention may be implemented, although as made clear above, the computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

With reference to FIG. 5, an exemplary system for implementing the invention includes a general purpose computing device in the form of a computer system 510. Components of computer system 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 510 typically includes a variety of computer readable media. Computer readable media can be any available media that can be accessed by computer system 510 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer system 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer system 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5 provide storage of computer readable instructions, data structures, program modules and other data for the computer system 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer system 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus 521, but may be connected by other interface and bus structures, such as a parallel port, game port or a universal serial bus (USB). A monitor 591 or other type of display device is also connected to the system bus 521 via an interface, such as a video interface 590, which may in turn communicate with video memory (not shown). In addition to monitor 591, computer systems may also include other peripheral output devices such as speakers 597 and printer 596, which may be connected through an output peripheral interface 595.

The computer system 510 may operate in a networked or distributed environment using logical connections to one or more remote computers, such as a remote computer 580. The remote computer 580 may be a personal computer, a server, a router, a network PC, a peer device or other common network node, and typically includes many or all of the elements described above relative to the computer system 510, although only a memory storage device 581 has been illustrated in FIG. 5. The logical connections depicted in FIG. 5 include a local area network (LAN) 571 and a wide area network (WAN) 573, but may also include other networks/buses. Such networking environments are commonplace in homes, offices, enterprise-wide computer networks, intranets and the Internet.

When used in a LAN networking environment, the computer system 510 is connected to the LAN 571 through a network interface or adapter 570. When used in a WAN networking environment, the computer system 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer system 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Webenabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of the invention may also be implemented via an operating system, application programming interface (API) or a "middle man" object between any of a coprocessor, a display device and a requesting object, such that operation according to the invention may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement search result combiner or blender. Thus, the methods and systems of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the discussed invention. Additionally, any storage techniques used in connection with the invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the invention should not be limited to any single embodiment, but rather should be construed in breadth and scope in accordance with the appended claims.

What is claimed:

1. A method for a generating an ordered list of documents, the method comprising:
    (a) receiving at least one search term;
    (b) searching in at least one document database for documents related to the at least one search term;
    (c) retrieving a first list of documents relating to the at least one search term and ranking the first list using a form of an OKAPI ranking algorithm forming a first ranked list;
    (d) searching in a query click-through data store to find documents previously retrieved and selected by at least one user where search terms similar to the at least one search term were used, the query click-through data store comprising a tabularized log of search terms, documents, and relevance frequencies;
    (e) accessing a second list of documents from the query click-through data store wherein the second list of documents represents selections of documents by at least one user under the conditions of previous searches;
    (f) ranking the second list according to one of a Naive Bayes and a Maximum Entropy ranking algorithm forming a second ranked list; and
    interleaving the first ranked list and the second ranked list forming an interleaved list of documents, wherein duplicate documents from the first ranked list and the second ranked list are removed from the interleaved list, and wherein steps (b) and (d) are performed in parallel.

2. The method of claim 1, further comprising:
    providing the interleaved list of documents to a user for review.

3. The method of claim 1, wherein searching in at least one document database comprises using a search engine connected to at least one document database via a network.

4. The method of claim 1, wherein searching in a query click-through data store comprises searching in one of a local query a query click-through data store or a networked query a query click-through data store.

5. The method of claim 1, wherein interleaving to form an interleaved list comprises alternating the occurrence of documents taken from the first ranked list and the second ranked list.

6. The method of claim 1, wherein interleaving comprises generating the interleaved list such that a first listed document of the second ranked list is a first entry in the interleaved list of documents.

7. The method of claim 1, wherein interleaving comprise generating the interleaved list such that a first listed document of the first ranked list is a first entry in the interleaved list of documents.

8. The method of claim 1, wherein if one of the first ranked list and the second ranked list is longer in length than the other, then interleaving further comprises appending a remainder of the longer list to the end of the interleaved list.

9. The method of claim 1, wherein ranking the first list comprises ranking the first list using a form of the OKAPI ranking algorithm and ranking the second list comprises ranking the second list using one of a Naive Bayes and a Maximum Entropy algorithm.

10. A system for a generating a list of documents, the system comprising:
 a processor having access to memory, the memory having instructions which, when executed, perform the method comprising:
  receiving at least one search term;
  searching in at least one document database for documents related to the at least one search term;
  retrieving a first list of documents relating to the at least one search term and ranking the first list using a form of an OKAPI ranking algorithm forming a first ranked list;
  searching in a query click-through data store to find documents previously retrieved and selected multiple users where search terms similar to the at least one search term were used, the query click-through data store comprising a tabularized log of search terms, documents, and relevance frequencies;
  accessing a second list of documents from the query log storage and ranking the second list according to one of a Naive Bayes and a Maximum Entropy ranking algorithm forming a second ranked list; and
  interleaving the first ranked list and the second ranked list forming an interleaved list of documents, wherein the steps of searching in the at least one database and searching in a query click-through data store are performed in parallel.

11. The system of claim 10, further comprising:
 a network interface for communications with the at least one document database located on the network.

12. The system of claim 10, further comprising:
 a network interface for communication with a search engine located on the network.

13. The system of claim 10, further comprising:
 a display device wherein the interleaved list may be reviewed.

14. A computer-readable storage medium having computer-executable instructions for performing a method for generating a list of documents, the method comprising:
 receiving at least one search term;
 searching in at least one document database for documents related to the at least one search term;
 retrieving a first list of documents relating to the at least one search term and ranking the first list using an OKAPI ranking algorithm forming a first ranked list;
 searching in a query click-through data store to find documents previously retrieved and selected multiple users where search terms similar to the at least one search term were used, the query click-through data store comprising a tabularized log of search terms, documents, and relevance frequencies;
 accessing a second list of documents from the query log storage and ranking the second list according to a second probabilistic ranking algorithm forming a second ranked list; and
 interleaving the first ranked list and the second ranked list forming an interleaved list of documents, wherein the steps of searching in the at least database and searching in a query click-through data store are performed in parallel.

15. The computer-readable storage medium of claim 14, wherein the method further comprises:
 providing the interleaved list of documents to a user for review.

16. The computer-readable storage medium of claim 14, wherein the method step of searching in at least one document database for documents related to the at least one search term comprises using a search engine connected to a document database via a network.

17. The computer-readable storage medium of claim 14, wherein the method step of interleaving comprises alternating the occurrence of documents taken from the first ranked list and the second ranked list.

18. The computer-readable storage medium of claim 14, wherein the method step of interleaving comprises generating the interleaved list such that a first ranked document of the second ranked list is a first entry in the interleaved list of documents.

19. The computer-readable storage medium of claim 14, wherein the method step of interleaving comprises generating the interleaved list such that a first listed document of the first ranked list is a first entry in the interleaved list of documents.

20. The computer-readable storage medium of claim 14, wherein the method step of ranking the second list according to a second probabilistic ranking algorithm forming a second ranked list comprises using one of a Naive Bayes and a Maximum Entropy algorithm.

* * * * *

UNITED STATES PATENT AND TRADEMARK OFFICE
CERTIFICATE OF CORRECTION

PATENT NO. : 7,424,469 B2  Page 1 of 1
APPLICATION NO. : 10/752901
DATED : September 9, 2008
INVENTOR(S) : Ratnaparkhi It is certified that error appears in the above-identified patent and that said Letters Patent is hereby corrected as shown below:

In column 14, line 18, in Claim 14, after "at least" insert -- one --.

Signed and Sealed this
Twenty-sixth Day of April, 2011

David J. Kappos
*Director of the United States Patent and Trademark Office*